(Model.)

N. A. RANSOM.
FARE REGISTER AND RECORDER.

No. 251,634.  Patented Dec. 27, 1881.

Witnesses:
O. W. Bond
B. A. Price

Inventor:
Newman A. Ransom
by his Attys
Baldwin, Hopkins & Peyton

(Model.)

N. A. RANSOM.
FARE REGISTER AND RECORDER.

No. 251,634. Patented Dec. 27, 1881.

Witnesses:
O. W. Bond
B. A. Price

Inventor:
Newman A. Ransom
by his Atty's
Baldwin, Hopkins & Peyton (Model.) 5 Sheets—Sheet 3.
N. A. RANSOM.
FARE REGISTER AND RECORDER.

No. 251,634. Patented Dec. 27, 1881.

Witnesses:
O. W. Bond
B. A. Price

Inventor:
Newman A Ransom
by his Attys
Baldwin, Hopkins & Peyton (Model.)

N. A. RANSOM.
FARE REGISTER AND RECORDER.

No. 251,634.  Patented Dec. 27, 1881.

Witnesses:
O. W. Bond
B. A. Price

Inventor:
Newman A. Ransom
by his Attys
Baldwin, Hopkins & Peyton

(Model.)

N. A. RANSOM.
FARE REGISTER AND RECORDER.

No. 251,634. Patented Dec. 27, 1881.

Witnesses:
O. W. Bond
B. A. Price

Inventor:
Newman A. Ransom
by his Attys
Baldwin, Hopkins & Peyton

UNITED STATES PATENT OFFICE.

NEWMAN A. RANSOM, OF CHICAGO, ILLINOIS, ASSIGNOR TO THE RAILWAY REGISTER MANUFACTURING COMPANY, OF BUFFALO, NEW YORK.

FARE REGISTER AND RECORDER.

SPECIFICATION forming part of Letters Patent No. 251,634, dated December 27, 1881.

Application filed July 19, 1880. (Model.)

*To all whom it may concern:*

Be it known that I, NEWMAN A. RANSOM, of Chicago, in the county of Cook and State of Illinois, have invented certain new and useful Improvements in Fare-Registers, of which the following is a specification.

My invention relates more particularly to the class of fare-registering machines which embody the following instrumentalities, to wit: first, a partial or trip register, the indications of which are exposed to view, for registering consecutively the fares collected on each separate trip of the car or vehicle, said trip-register being capable of being readily set to zero, or the starting-point, at the end of each trip to commence registering anew; second, a total, permanent, or general register, moving concurrently with the trip-register, for consecutively and permanently registering in the aggregate the total number of fares collected on the several trips, said total-register being incapable of the resetting movements of the trip-register; third, mechanism for actuating the trip and total registers simultaneously, or nearly so; fourth, mechanism for indicating the number of times the partial or trip register has been set to zero to commence registering anew, and consequently the number of trips made; and, fifth, an alarm apparatus, which is sounded once for each fare registered on the trip and the total registers, to audibly announce the proper actuation of the machine.

My said invention constitutes an improvement more particularly upon the fare-register shown, described, and claimed in my Letters Patent No. 226,626, of April 20, 1880, granted on an application filed July 12, 1879, and in my application for Letters Patent filed on or about the 30th day of August, 1879, as a division of said application of July 12, 1879. My said patented register, to which my present improvements are more particularly directed, involves a new principle in the art of registering fares, so as to place a check upon peculation or fraud on the part of the conductor, in that not only is the number of times the trip-register is reset independently of the total-register indicated, but also the exact state of the trip-register at each resetting; or, in other words, the number of fares registered on the trip-register between the times of resetting is accurately indicated in addition to the indication of the number of trips, whereby the total-register may add up and indicate in the aggregate the whole number of fares received for a long time, while the number of fares collected on each trip is separately recorded and preserved independently of the indications of the trip-register, which are lost by the resetting to zero. The manner in which frauds can be committed with the old type of zero-registering machines is fully set out in my aforesaid patent of 1880 and application of August 30, 1879, and therefore need not be elaborately repeated in this case.

The object of my present improvements is to provide an improved fare-register; and my invention consists in certain new combinations and organizations of devices, and in a new construction of recording slips or dials, which are recited at the close of the specification.

The accompanying drawings show my invention as embodied in the best way now known to me. It will be understood, however, that some of my improvements may be used without the others, and some of them may also be used in machines differing somewhat in construction from that shown in said drawings.

Fig. 11ᵃ is an edge view of a portion of the rear partition-plate of the machine, carrying the guides for the reciprocating marker of the trip-recording device.

The inclosing casing A of the machine is preferably constructed in the form shown in the drawings—that is to say, with a front plate, $a$, and back plate, $a'$, said plates being smaller at their upper ends than at their lower ends, and united by a rim, $a^2$. The casing thus completed incloses the operative parts of the mechanism, so as to prevent unauthorized access thereto or tampering therewith. The casing is preferably made in the flat tapering form described, as it is best adapted to contain the mechanism as organized in the present instance. A main central partition-plate, B, is mounted in the casing parallel with the front and back plates thereof, and carries the operative parts of the apparatus within said casing. Upon the front side of said plate B, in this example, is the main actuating-wheel C, the two trip-register disks or wheels D D', the actuating-lever E, which operates said wheels C D D' in the process of counting, the zero gathering or turning covering-plate G and its mechanism, by which the trip-disks are reset to commence registering anew, the bell-hammer lever P, and the bell Q. Upon the rear side of said partition-plate B are the total-register wheels J J' and the trip-recording devices. The main partition-plate B is provided at the center of its lower enlarged end with a fixed tubular boss or stud-shaft, $e$, (clearly shown in the sectional view, Fig. 13, as projecting toward the front,) the rear end of said boss being preferably reduced in size, and screw-threaded externally to screw firmly into a screw-threaded opening in the plate.

The lower or hub end, P', of the bell-hammer lever P is fitted, next the plate B, to the boss or shaft $e$, so as to rock upon it as a pivot or axis when vibrated, while just in front of said bell-hammer hub the upper end of the vibrating actuating-lever E of the machine is also fitted upon said boss, so as to rock freely, when moved by the operator, to work the register. The bell-hammer lever and actuating-lever are confined around the boss or shaft $e$, between the main partition plate B and an auxiliary front partition-plate, B', carried by the main plate. The tubular boss or shaft $e$ is screw-threaded internally to receive a tubular externally screw-threaded supporting-post, $e'$. Said post is screwed firmly into the boss $e$, so as to form a fixture of the plate B, and constitutes the support and axis in front of the partition-plate B' of the main actuating-wheel C, and the partial or trip-register disks D D', and also the support of the zero gathering or turning covering plate G, while in rear of the main partition-plate B said post forms the axis of the total-register wheels J J'.

Figures 7, 10:
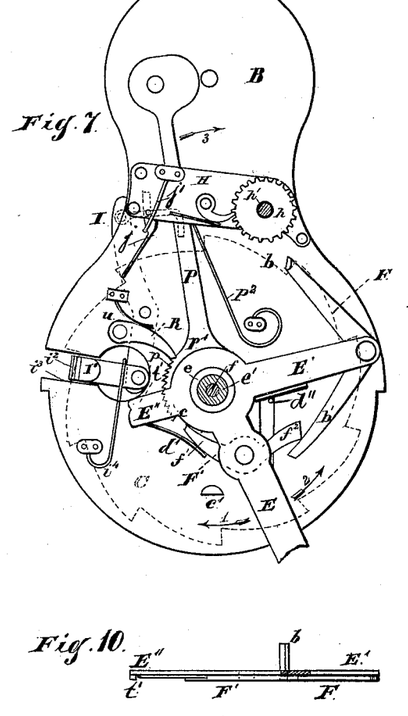
Fig. 7 is a front view of the main partition and supporting-plate which carries the operative parts of the apparatus, the view showing more particularly the actuating-lever and its connections, and also the bell-hammer lever and the intermediate vibrating lever at the back of the supporting-plate, the function of which last-mentioned lever is to operate the total-register.
Figs. 10 and 10ᵃ are edge views of the actuating-lever and its driving-pawls.
Figures 13, 18, 19:
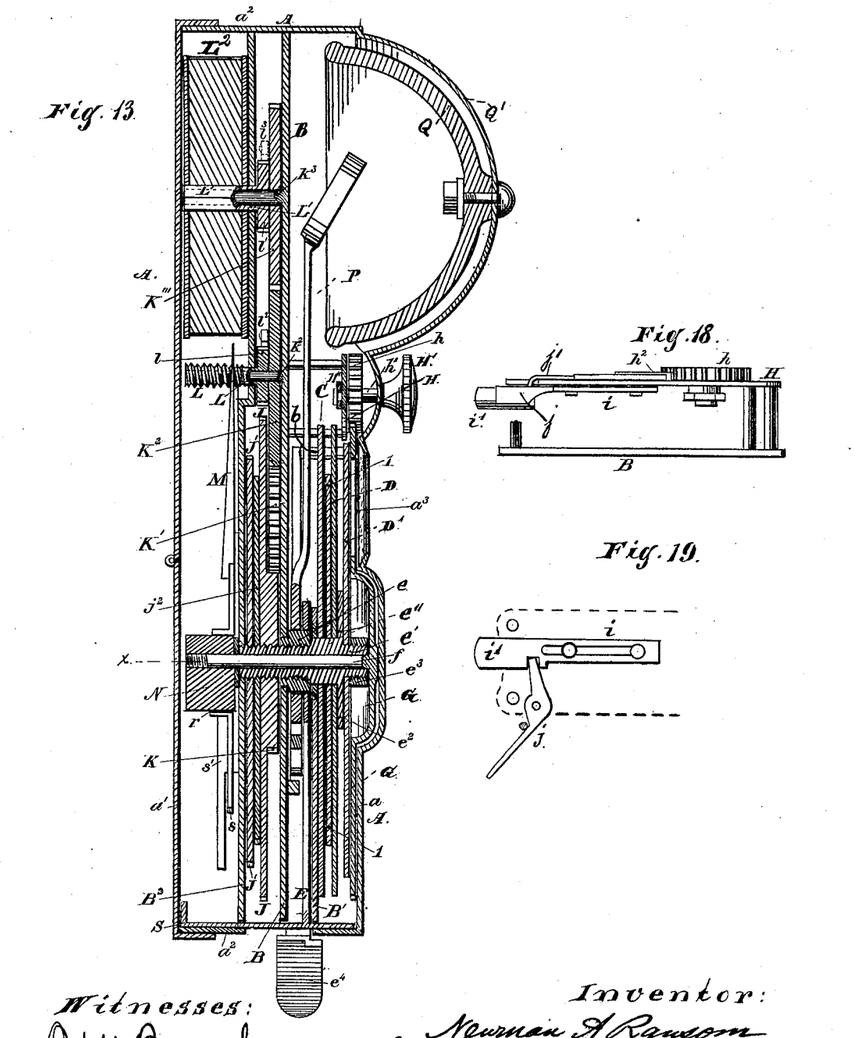
Fig. 13 is a longitudinal central section through the apparatus on the line 13 13 of Fig. 1, the view being on an enlarged scale.
Fig. 18 is an edge view, looking from below, of the devices for operating the zero-gathering or turning covering plate.
Fig. 19 is a top view of a portion of said devices, the supporting bridge-piece of which is shown in dotted lines, the parts in full lines being behind or back of said plate, as shown in Fig. 18.

The main actuating-wheel C, which is shown in dotted lines in Fig. 7 and in section in Fig. 13, lies next the front face of the front partition-plate, B', and has its periphery provided with ten equidistant cam-notches, similar to those formed in the edges of the trip-disks, which latter are clearly shown. Said cam-notches serve a twofold purpose—first, to enable the wheel to be rotated step by step by means of a spring-pawl, F, carried by the actuating-lever E, and, secondly, to operate an intermediate vibrating lever, I, by which the total-register wheels and trip-recording or zero-register wheel or drum are actuated.

The indicating wheels or disks D D' of the partial or trip register are preferably two in number, and are located, one above the other, in front of the main actuating-wheel C, and upon the same axis, there being interposed between the rear trip-disk, D, (in this example,) and said actuating-wheel C a suitable isolating-plate or washer, 1, to prevent the independent movements of the trip-disks, during their resetting operation, from interfering with the said actuating-wheel or turning it. A circular flange or collar, $e^2$, is formed upon the post $e'$, and is interposed between the trip-disks D D', the front disk, D', being slipped upon the post $e'$ in advance of said collar $e^2$, and held in place, for instance, by a screw-nut, $e^3$.

The rear trip-disk, D, is the units-disk of the trip-register—that is, it is capable of registering from 1 up to 10 consecutively, being provided on its front face, near its periphery, with the figures 0 to 9, inclusive, as usual, and having also in said periphery cam-notches corresponding in number and length with those in the actuating-wheel C, though not so deep. The tenth notch, $d^3$, however, in the disk D is deeper than the rest, being about the same depth, for example, as the notches in the wheel C.

The front trip-disk, D', is the tens-disk of the trip-register—that is, it is capable of registering tens, it being turned the distance of one notch for each complete revolution of the units-disk. Said tens-disk is slightly smaller than the units-disk, and, like said units-disk, it has ten equidistant cam-notches in its periphery, and is also provided on its front face with the figures 1 to 9, inclusive, a blank space being left between the figures 1 and 9. Between the figures on the tens-disk D' are openings in the disk, which permit the figures on the rear or units-disk, D, to be inspected through them, as usual.

The indications of the trip-register are inspected through a glass-covered opening or window, $a^3$, in the face-plate of the casing, and are always exposed to full view, so that the successive numbers, as the disks are turned in the counting process, may be freely observed by those in the car, while they cannot be tampered with through said window.

The tens-disk D', as has been stated, is turned the distance of one notch only for every complete revolution of the units-disk D; and in order to prevent the movement of one wheel or disk by the other, I have interposed the isolating-collar $e^2$, before mentioned.

Figure 1:
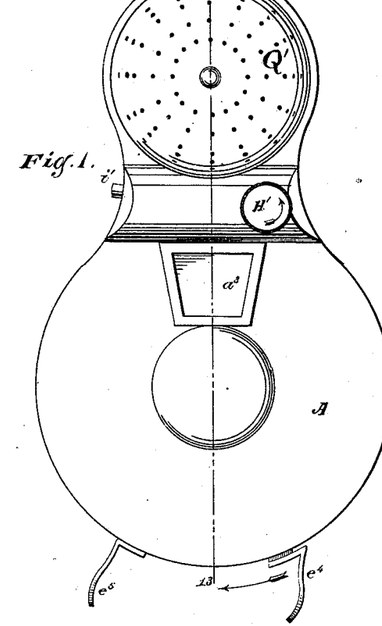
Figure 1 represents a face view of my improved fare-registering apparatus.

The prime mover or actuating-lever E, as before stated, is mounted so as to turn or vibrate upon the boss or shaft $e$ at the front of the partition-plate B. Said lever is a flat bent lever, or, in other words, has in addition to its flat handle portion E an arm or flat extension, E', extending nearly at right angles to the handle portion. (See Figs. 7, 8, and 9.) The handle portion of the actuating-lever extends down through an opening or slot in the rim $a^2$ of the register-casing at the bottom, and terminates outside the casing in a suitable finger piece, $e^4$, by which the lever is rocked or moved, a suitable fixed finger-piece, $e^5$, being attached to the casing, as shown in Fig. 1, opposite the finger-piece $e^4$, for convenience of operation.

The bent arm or extension E' of the lever E is entirely inclosed within the casing, and carries a preferably angular or bow-shaped driving-pawl, F, next the main partition-plate B. Said pawl F is preferably pivoted at or about its center to the back of the outer end of the arm E' of the actuating-lever, so that its arms extend each side of said arm E', as clearly shown in Figs. 7 and 9 of the drawings. The extreme upper end of the upper arm of the pawl F is provided with a lug or point, $b$, which projects forward toward the front of the machine at about right angles to the arm of the pawl which carries it, (see Figs. 3, 7, and 13,) and this point $b$ is the actuating-point of the driving-pawl, being of such a length as to extend forward a sufficient distance to engage not only the notches in the periphery of the main actuating-wheel C, but also the notches in the edges of the trip-disks D D'. The side of the front partition-plate, B', next the pawl F is cut away to permit free movement of said pawl. As the lever E is rocked by its finger-piece $e^4$ toward the fixed finger-piece $e^5$ of the casing, the driving-pawl F is also rocked or brought down, so as to cause the actuating-point $b$ thereof, which engages one of the notches in the main actuating-wheel C and one in the units-disk D, to carry said wheel and disk around with the lever the distance of one notch or one point, bringing a new figure of the disk at each successive action of the lever before the window $a^3$ in the casing, and thereby consecutively counting the fares as they are collected, the operator being required to operate the machine once for each fare received. A spring, $d''$, located upon the under side of the plate B, (see Fig. 8,) acts upon the actuating-lever, as usual, (through a slot in said plate in this instance,) so as to automatically return it to its normal position, in readiness for a new actuation when the actuating force or the hand of the operator is removed. At the tenth actuation of the actuating-lever E the actuating end $b$ of the driving-pawl F drops into the tenth notch, $d^3$, in the units-disk D, which is deeper than the rest, and said actuating end $b$ (which has hitherto been kept out of engagement with the tens-disk D', owing to the shallowness in depth of the notches in the units-disk) now engages the first notch in the tens-disk D', to turn said disk the distance of one notch, thereby bringing the figure 1 of the tens-disk opposite the window $a^3$, while the zero-mark of the units disk is also brought opposite said window, so that, starting the register at zero, the indication will show that ten fares have been collected by the conductor and duly registered. This consecutive counting operation may be continued up to 99, which is the limit of the capacity of the trip-register in this example, such a capacity being amply sufficient for all practical purposes.

The pawl F is freely pivoted to the under side of the bent arm E' of the lever E, and is held in engagement with the wheel C and the disks D D' it is to operate by means of a spring, $d$, which gives the pawl a yielding capacity, one end of said spring being secured to the under side of the arm E', while its free end fits within a notch in the pawl, and acts thereon so as to force its actuating-point $b$ into engagement with the notched edges of said wheel and disks. The lower arm, $b'$, of the driving-pawl F, I call a "non-actuating" arm, and its function will presently be mentioned.

In order to sound an alarm once for each actuation of the machine, which adds a number to the count or tally, whereby to notify those in the car that a proper actuation has been made, and to prevent the alarm from being sounded except at the close of a complete movement of the actuating-lever sufficient to move the counting-wheels the required distance, so that a partial movement of the lever insufficient to add a new number to the count will not suffice to sound the alarm, I have devised an organization which I will now describe.

Figure 9:
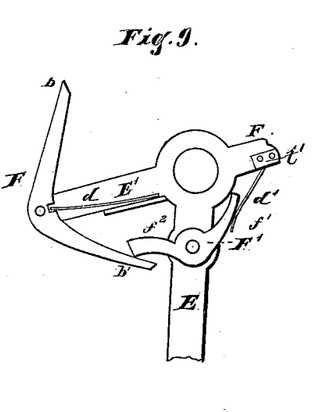
Fig. 9 is a back view of the actuating-lever and its driving-connections.
Figure 10A:
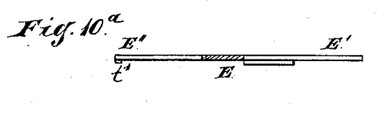

The bell-hammer lever P, as before stated, by a hub or enlargement, $P'$, at its lower end, is fitted so as to rock upon the boss $e$. The actuating-lever E is provided with a bell-hammer-actuating pawl, $F'$, pivoted at or about its center to the rear side of said lever, as shown in Figs. 7 and 9, so that it lies crosswise of the lever, whereby one end, $f'$, (called its "actuating end,") is adapted to engage a notch, $c$, in the hub of the bell-hammer lever to rock that lever when the lever E is worked, while the opposite or non-actuating end, $f^2$, of the pawl is in contact with or engaged by the non-actuating end $b'$ of the register-driving pawl F. The two pawls F F' are so organized that their actuating ends perform their respective offices as the actuating-lever is rocked forward, (from right to left in this example.) A spring, $d'$, acts upon the bell-hammer pawl F' to hold its actuating end in engagement with the notch $c$, one end of said spring being secured to the arm $E^2$ of the actuating-lever E, while its free end acts against the pawl.

Figure 8:
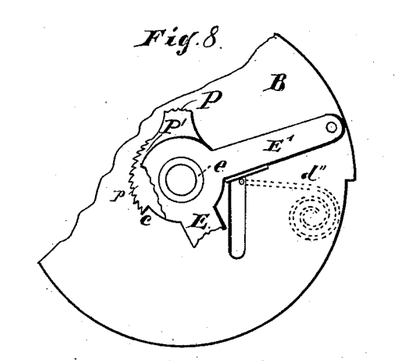
Fig. 8 is a view of a portion of the main partition, supporting-plate, and actuating-lever, the view showing in dotted lines the spring which returns the lever to its normal position after being moved or vibrated in the direction to actuate the registering devices and alarm.

A series of ratchet-teeth, $p$, are formed in the edge of the hub $P'$ of the bell-hammer lever, as clearly shown in Figs. 7 and 8, and a detent-pawl, R, pivoted to the front face of the plate B, and held to its work by a spring, $u$, engages said teeth. During the forward actuating movement of the lever E, which rocks the bell-hammer lever (in the direction indicated by the arrow 3 in Fig. 7) away from the edge of the bell, the teeth $p$ will successively slip past the point of the detent-pawl R, which yields upwardly for the purpose, while no back movement or recoil of the bell-hammer lever will be permitted until said pawl R is disengaged from said teeth, and inasmuch as the pawl R is not disengaged until the movement of the actuating-lever E is effected sufficient to operate the register it will be obvious that a movement of the said lever E short of that required to fully advance the register-wheels or disks will have no effect upon the alarm-bell, and it will not be sounded. Near the close of the movement of the actuating-lever E which has effected the advance of the register-wheels the proper distance the detent-pawl R is positively raised or disengaged from the ratchet-teeth $p$ in the hub of the bell-hammer lever by means of a lug or projection, $t'$, on the under side of the arm $E^2$ of the lever E, while just afterward, or at the end of the movement of said actuating-lever, the non-actuating end $f^2$ of the pawl F' comes against a fixed stop or projection, $c'$, on the face of the plate B, and said pawl is thereby rocked upon its pivot so as to disengage its actuating end $f'$ from the notch $c$ in the bell-hammer hub. This leaves the hammer-lever free to be thrown quickly, and with considerable force, against the edge of the bell Q by the action of an impelling-spring, $P^2$, (against the force of which the hammer-lever has been rocked,) to sound the alarm.

It will thus be seen that as the lever E is rocked forward to actuate the wheel C and trip-register wheels D D' the bell-hammer is also actuated against the force of its impelling-spring, while it cannot be thrown against the bell to sound the alarm (owing to the pawl R) until a complete movement of the lever is effected sufficient to operate the register-wheels. As soon, however, as the lever is moved the requisite distance the detent-pawl R and pawl F' are disengaged from the hammer-arm, and said arm is thrown by its spring against the bell. The actuating-lever E is then automatically returned to its normal actuating position by its returning-spring.

Owing to the contact or engagement of the non-actuating arms or ends $b'$ $f^2$ of the actuating-pawls F F', the driving end $f'$ of the bell-hammer pawl F' is prevented from engaging the notch $c$ of the bell-hammer hub upon the return-stroke of the actuating-lever until the driving end $b$ of the register-actuating pawl F engages with the next notch of the main actuating-wheel C and trip-register disk D.

The alarm-bell Q is located at the top of the machine, in front of the main partition-plate B, and is struck but once for each full actuation of the lever E, and consequently but once for each fare received. The bell is a concavo-convex one, of the usual construction, and is protected by a perforated cap, $Q'$, also of the usual form, which permits the free escape of the sound-vibrations.

At the end of every trip or half-trip, as the case may be, it is the duty of the conductor to reset his trip-register, or, in other words, to bring it to the zero or starting point to commence registering anew, and this result I accomplish without moving or interfering with the actuating-wheel C, which is independent of the trip-register disks, and separated therefrom by an interposed washer, as before stated, by means of a turning covering-plate, G, broadly patented to me under date of May 14, 1878, as No. 203,773. This plate is firmly secured within the casing, in front of the faces of the trip-disks D D', to the front end of a spindle or stem, $f$, which passes through the hollow supporting-post $e'$, and is capable of freely turning therein. Said covering-plate G is provided on its edge with gear-teeth $g$, with which a gear-pinion, $h$, meshes to rotate the plate. The shaft $h'$ of the pinion has its front bearing in the face-plate of the casing, and its rear bearing in a supporting bridge-piece, H, connected by suitable posts with the partition-plate B.

Figure 2:
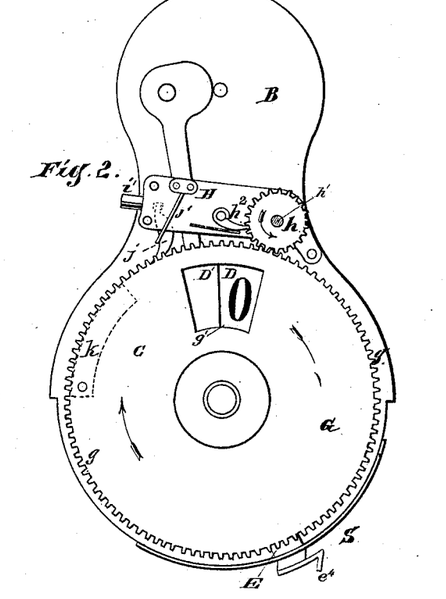
Fig. 2 is a front view thereof with the casing and alarm-bell removed, the view showing more particularly the turning covering-plate and its operating mechanism, by which the trip-register is reset and its indication obscured in the act of resetting.
Figures 3, 4, 5, 6:
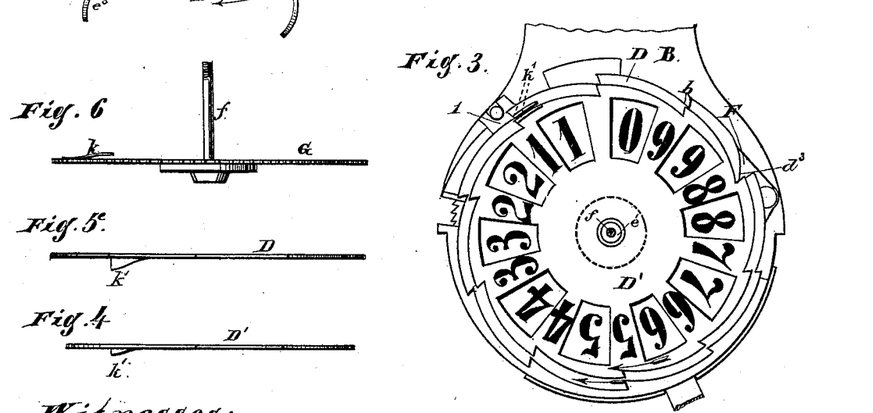
Fig. 3 is a front view with the casing and covering-plate removed to show the construction of the numbered disks or wheels of the trip-register.
Figs. 4, 5, and 6 are edge views respectively of the units-disk of the trip-register, the tens-disk of said register, and the turning covering-plate by which said disks are reset.

Upon the front end of the pinion-shaft, outside the casing, is fastened a finger-piece, knob, or button, H', by which the pinion is turned to rotate the covering-plate in front of the trip-disks. Said plate, upon its side next the trip-disks, is provided with a spring-plate, $k$, conforming in shape at its outer edge to the edge of the plate. Said spring-plate $k$ is fastened at its rear end to the covering-plate, while its front end is bent back, so as to lie at a little distance from the rear face of the plate, as shown in Figs. 2 and 6. The bent front end of said spring-plate $k$ is adapted to engage inclined setting-projections $k'$ on the face of the trip-disks D D', near the peripheries thereof, the setting-projection of units-wheel D being in the construction shown placed a little to the left of the figure 1, and the setting-projection of the tens-disk D' a little to the right of its figure 1. The said covering-plate is further provided with a view slot or opening, $g'$, corresponding in shape with the window $a^3$ of the inclosing-casing, through which the indication of the trip-register is inspected.

As has been before stated, at each complete movement of the actuating-lever its driving-pawl F will cause the units-disk of the trip-register to advance one number, and when nine registrations have been made the pawl, having reached the deep notch in said units-disk, will drop down and come into engagement with one of the notches of the tens-disk, and carry said disk forward until it shows a new figure at the window. During the forward movements of these disks the setting-projections $k'$, especially the one on the units-disk D, must frequently pass the spring-plate $k$ of the covering-plate. To enable them to easily pass said spring the projections are inclined downwardly in the direction of rotation of the disks, as clearly shown in Figs. 3, 4, and 5, and as they come in contact with the bent end of said spring-plate they wedge or force it against the plate G, but as soon as they, or either of them, pass said spring resumes its normal position by its elasticity.

The covering-plate G rotates only in one direction, which is indicated by the arrow in Fig. 2, it being prevented from rotation to the left, or in a direction opposite to the rotation of the trip-disks, by means of a pawl, $h^2$, pivoted to the bridge-piece H, and kept in engagement with the pinion $h$ by a spring. This pawl $h^2$ permits the pinion to be turned by its finger-piece outside the casing in the direction indicated by the arrow upon the pinion, but prevents movement in the contrary direction. Said covering-plate is prevented from being rotated by the forward movement of the disks D D' by means of a catch, $j$, pivoted to the under side of the bridge-piece H, and having its lower end kept normally in the path of the bent end of the spring-plate $k$ on the covering-plate by means of a spring, $j'$. The upper end of said pivoted spring-catch $j$ fits in a notch or recess in a slide, $i$, held to, but permitted to move endwise on, the back side of the bridge-piece. The outer end of said slide $i$ projects through a lateral opening in the casing and terminates in a button or actuating end, $i'$.

When it is desired to rotate the covering-plate to gather the trip-disks so as to indicate 0, or the starting-point, at the window $a^3$ the slide $i$ is pressed inward, which rocks the catch $j$ on its pivot and carries its lower end out of the path of the spring-plate $k$. The knob or button on the spindle of the pinion $h$ is then turned so as to rotate the covering-plate in the direction of rotation of the trip-disks, which causes the raised end of the spring-plate $k$ to engage the vertical or abrupt sides of the setting-projections $k'$ one after the other, or both together, according to their position in the circle in which they move, thereby carrying the disks by their projections $k'$ around until the spring-plate again comes in contact with the point of the spring-catch $j$, which now stands in its path, it being moved into its normal position as soon as the pressure upon the end of the slide $i$ is removed by the force of the spring $j'$. The mechanism is so organized that when this point is reached the view-slot $g'$ of the covering-plate is exactly opposite the window $a^3$ in the casing, while the zero-mark of the trip-register only is exposed to view.

The unbroken part of the covering-plate G entirely covers the trip-disks and screens them from view while they are being reset or brought to the zero or starting point, as will be obvious. Said plate cannot be rotated backward by reason of the pawl $h^2$, before mentioned. It will therefore be obviously impossible without violence to rotate the plate forward less than a full revolution to show any number whatever at the window $a^3$, or to rotate it a full revolution and display any other figure than 0.

Figure 12:
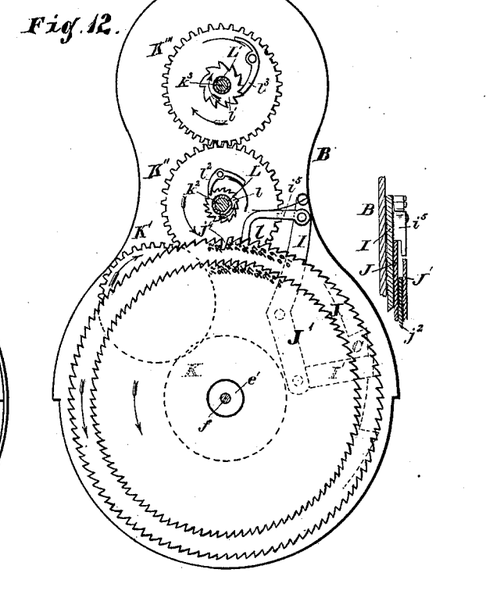
Fig. 12 is a view from the back of the total-register wheels and the gearing by which the wheel or drum which carries the trip-recording slip or dial is rotated, the casing and parts in rear of said register-wheels and gearing being removed.

It has been stated that the actuating-wheel C by its cam-notches serves to operate an intermediate lever, I, which in turn actuates the total-register wheels and the zero-register or trip-recording wheel. Said intermediate lever, I, is pivoted to the back of the partition-plate B, as shown in Figs. 7 and 12, and articulated to its lower end is a bar, I', the free end of which is bent forward at right angles, so as to form a hook or overlapping portion, $i^2$, which is fitted to play back and forth in a lateral slot, $i^3$, in the plate B, and corresponding slot in the plate B', and engage successively the cam-faces of the notches in the periphery of the actuating-wheel C as said wheel is turned by the actuating-lever E.

A spring, $i^4$, fastened at one end to the partition-plate B, acts upon the bar I' of the lever I, and operates to maintain the hooked or overlapping end of said bar at all times in engagement with the cam-notches of the wheel C and to force it inward after each outward movement due to the camming action of the wheel C. The upper end of said intermediate lever, I, carries a spring-pawl, $i^5$, (shown in Fig. 12 and in dotted lines in Fig. 7,) to operate the wheels of the total-register, and through said register the wheel or drum of the trip-recording or zero-registering mechanism. Said total or permanent register is of simple construction. It consists of two graduated wheels, J J', mounted upon the axis-post $e'$, around which they turn when actuated, an isolating washer or plate, $j^2$, (clearly shown in Fig. 13,) being placed between the said wheels to prevent the motion of one being communicated to the other. The wheel J' is of slightly smaller diameter than the wheel J, and is placed back of said last-mentioned wheel. Each of said wheels is provided with peripheral notches or teeth, numbered consecutively from 0 to 100. Each time the main actuating-wheel C is operated by the prime actuating-lever E the lever I is rocked upon its pivot by having its lower end carried outward toward the edge of the partition-plate B, owing to the camming outward of the hooked end of the bar I' by the cam-surface of the wheel, and thus the upper end of said lever I is caused to move inward toward the center of the apparatus. This movement causes the pawl $i^5$, which is in engagement with a tooth of the wheel J, to move said wheel the distance of one tooth or one point, and said wheel is moved consecutively one tooth after another, one tooth for each operation of the actuating-lever E, and consequently it registers the same number as is registered upon the partial or trip register in the course of a trip; but, unlike the trip-register, the total-register is incapable of being reset at will, and is intended to preserve a permanent and continuous record of the aggregate number of the fares collected on a large number of trips. When the first of the total-register wheels, J, has made a complete revolution—or, in other words, has registered one hundred fares—the pawl $i^5$, (which has two operating-points, as shown in Fig. 12,) in making the one-hundredth registration, has reached a notch, $j^4$, deeper than the previous ones, and, dropping down therein, engages with the first notch of the second wheel, J', whereby said second wheel is advanced one point, and indicates that one hundred fares have been registered, while the first wheel stands at its zero or starting point. Thus it will be seen that the total-register, while registering evenly and concurrently with the trip-register, has a very large capacity for continuous registration, being capable of registering nine thousand nine hundred and ninety-nine fares, which is deemed to be a capacity amply sufficient for the total-register. The total-register faces toward the back of the machine, and the state of the register is ascertained at a glance by observing the numbers on the disks beneath the glass-covered slot $j^5$, Fig. 11, in the rear partition-plate, $B^2$, of the machine, which plate covers the total-register wheels, so as to protect them from all undue manipulation.

I have thus far described the partial or trip register, which indicates the number of fares registered during the current trip, the total-register, which preserves a record in the aggregate of all the fares registered, and the alarm apparatus, which is sounded once for each fare recorded by said trip and total registers in the counting process.

I will now describe the mechanism by which the number of times the trip-register is reset to the zero or starting point by its resetting mechanism is indicated, and by which the state of the trip-register at each resetting thereof is permanently recorded.

Figure 11:
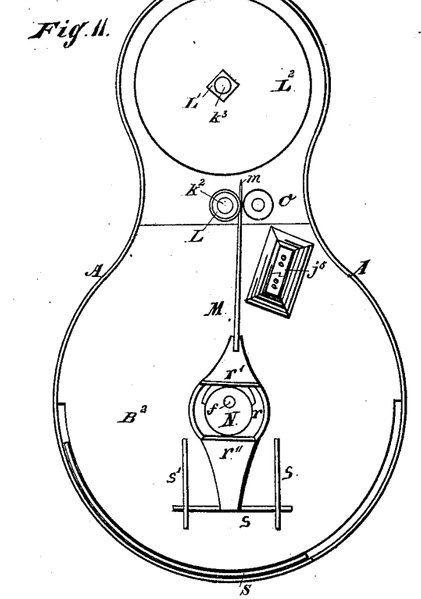
Fig. 11 is a view of the back of the register with the back plate of the casing removed, the view showing more particularly the trip-recording devices, which make a record of the number of times the trip-register is reset and the number said register shows at the time of resetting, the protected opening through which the indications of the total-register are inspected being also shown in said figure.
Figure 11A:
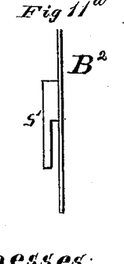

Formed with or firmly connected centrally to the total register wheel J is a gear-wheel, K, so that said gear-wheel is turned as the register-wheel is moved in the counting process. Said wheel K meshes with and turns an idle gear-wheel, K', and said wheel K' in turn meshes with and drives a corresponding wheel, $K^2$, turning around a fixed stud-axle, $k^2$, projecting from the partition-plate B toward the back of the machine. Said gear-wheel $K^2$ in its turn meshes with and drives a corresponding gear-wheel, $K^3$, which, like the wheel $K^2$, is capable of turning around a fixed stud-axle, $k^3$, projecting rearwardly from the main partition-plate B. Surrounding said stud-axles $k^2 k^3$, respectively, are tubular sleeves L L', and the respective sleeves are provided next the gear-wheels $K^2$ $K^3$ with ratchet-wheels $l$ $l'$, with which pivoted spring-pawls $l^2$ $l^3$ on said gear-wheels engage, when said wheels are turned in a forward direction, in order to turn the ratchet-wheels and their respective sleeves concurrently and at even pace when the total-register is operated, the direction of rotation of the gear-wheels being indicated by the arrows in Fig. 12. The sleeve L has a screw-thread formed upon it, as shown in Figs. 11 and 13, while the sleeve L' has a periphery of square shape, or has flat sides, the objects of which constructions will presently be mentioned. When the gear-wheels $K^2$ $K^3$ are turned in a forward direction by the action of the register-wheel J the said gear-wheels and their sleeves L L' will turn together, while, if the sleeves are turned independently in the forward direction, no movement will be given said gear-wheels, as the ratchet-wheels $l$ $l'$ cannot take hold of their respective pawls $l^2$ $l^3$. No back movement can be imparted to said gear-wheels $K^2$ $K^3$, as the total-register wheels are locked from back rotation not only by the actuating-pawl $i^5$, but by the usual simple independent pawls or detents usually employed to prevent back motion of register-wheels. It will thus be evident that no alteration of the record made by the total-register can be effected through the sleeves L L'.

Figure 16:
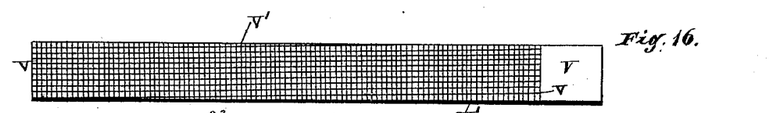
Fig. 16 is a plan view of one form of trip-recording slip or dial.
Figure 17:
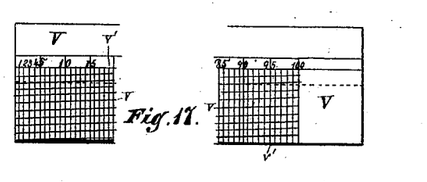
Fig. 17 is a similar view of another form of slip or dial.

Upon the square sleeve L' is fitted a circular drum or wheel, $L^2$, having at its center a square opening to receive said sleeve, and the drum thus partakes of the forward movements communicated to the sleeve. This drum or wheel $L^2$ carries a slip or strip of paper, V, or other material which can be marked or punctured. The slip is wound around the periphery of the drum between its front and back flanges. Said paper slip or dial is shown in Figs. 16 and 17 as spread out, and it is provided on its face with a number of longitudinal parallel lines, $v$, and a number of transverse lines $v'$, the said lines $v$, when the paper slip is wound about the drum or wheel $L^2$, forming a spiral line around the drum, the pitch of which should correspond with the pitch of the screw-thread upon the sleeve L, the distance between the lines of the spiral being the same as and coinciding with that between the threads of said sleeve. The transverse lines, $v'$ divide the lines of the spiral around the drum into spaces corresponding to the number of teeth in the total-register wheel J, and the spaces are of a size sufficient to receive a puncture or mark. For instance, as the wheel J has one hundred teeth, and is capable of registering that number, the number of transverse lines $v'$ on the paper slip should be sufficient to form a corresponding number of spaces around the drum between the spiral lines, and if ten working threads are on the sleeve L the number of longitudinal parallel lines on the paper slip should be sufficient to form a spaced spiral ten rows deep.

In Fig. 16 the slip is shown in plain form with simple longitudinal and transverse lines, while in Fig. 17 I have shown every fifth line extended above the others and numbered up to 100 for ease in reading the slip.

Figures 14, 15:
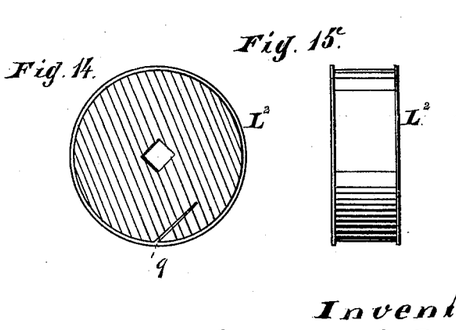
Figs. 14 and 15 are respectively a sectional and peripheral view of the wheel or drum which carries the trip-recording slip or dial.

The paper recording-slip may be attached to the drum or wheel $L^2$ in any suitable manner that will permit of its ready removal—at the close of a day's work, for example. In Fig. 14 I have shown the drum $L^2$ as provided with a slit, $q$, in which one end of the paper slip V may be inserted and the slip then wound around the drum, the opposite end being gummed or otherwise fastened to secure said end. The longitudinal lines $v$ of the paper slip are so inclined or formed that when the slip is placed around the drum the end of the first line will meet and correspond with the commencement of the second, and the end of the second with the commencement of the third, and so on, the last line ending where the first began, but at the other end of the drum, thereby forming a spiral line around the drum corresponding to the spiral of the thread upon the sleeve L.

The drum or wheel $L^2$ of the trip-recording devices is shown in this example as resting against the rear partition-plate, $B^2$, while the screw-threaded sleeve L is also shown as extending out beyond said plate. A bar, M, having a marking or puncturing point, $m$, at its upper end, is fitted to reciprocate upon the rear face of the partition-plate $B^2$. The upper or marking end of the bar M rests in the thread of the screw on the sleeve L, and the length of the bar is such that it may be advanced to cause its marking end to puncture or mark the paper slip V on the circumference of the drum or wheel $L^2$. The lower end of the bar M is held in position and guided in a straight line by means of a cross-piece, $s$, which projects on each side of the bar and works in slotted guides $s'$ $s'$, secured to the plate $B^2$, said guides permitting the free reciprocation of the bar. The marking or puncturing bar M is reciprocated to mark the recording-slip V only when the trip-register is being reset, and this is accomplished by a cam or eccentric, N, securely fastened to the rear end of the shaft or spindle $f$ of the zero-gathering or turning covering plate G, so that as the covering-plate is being turned the eccentric will be operated. Said eccentric is fitted in an opening, $r$, formed in the enlarged part of the bar M, as clearly shown in Figs. 11 and 13, and is so organized that its periphery will come in contact with the flanges $r'$ $r^2$ and reciprocate the bar, the contact with the flange $r'$ advancing the bar and with the flange $r^2$ receding the bar, and said cam or eccentric is so located with reference to the turning covering-plate G that at the commencement of the movement of said plate to reset the trip-disks D D' the cam will act on the flange $r'$ and advance the bar M, so as to cause its point to pierce or mark the paper slip V, while the point will be receded or drawn back by the contact of the cam with the flange $r^2$ when the covering-plate is completing its revolution.

It will be noticed that the rear partition-plate, $B^2$, is shown as extended the entire length of the casing, in which case the drum $L^2$ will be located between it and the back plate of said casing; but said plate $B^2$ may only extend part way of the length of the casing from the bottom up, in which case the drum will be located on the back of the main partition-plate B, with the driving-gearing of said drum at the front of the plate.

In order to hold the marking point $m$ in the groove of the screw-threaded sleeve L, and thus insure the proper action of the screw in raising the marking-point, so as to cause it to follow the spiral line of the recording-slip as the drum $L^2$ and screw are simultaneously turned by their gearing, I mount upon a stud-shaft projecting from the plate B parallel with the stud-axle $k^2$ of the sleeve L a turning block or sleeve, O, which block is in close proximity to the screw-threaded sleeve, the point $m$ working between the two, as clearly shown in Fig. 11. The marking-point $m$, it will thus be seen, cannot escape from the thread of the screw-sleeve L.

The arrangement of the gearing which imparts movement to the drum-wheel $L^2$ and screw-threaded sleeve L is such that the movement of said drum and sleeve will be coincident one with the other and with the total-register wheel J, and the location of the marking-point $m$ of the marking-arm M in the groove of the threaded sleeve L will cause it to follow the course of the thread of the screw, and consequently that of the spiral of the recording-slip on the drum $L^2$, so that as the drum is revolved the marking-point $m$, when the trip-register is reset, will pierce a space in the recording-slip at a point which corresponds to the number registered upon the trip-register, inasmuch as the drum carrying the recording-slip is advanced step by step concurrently with the trip and total registers and registers the same number by the numbered spaces on said slip, and inasmuch as the marking-point is only advanced when the turning covering-plate G is moved to reset the trip-disks, as before stated.

Inasmuch as the actuating-lever E of the machine is a vibrating lever, a slot of considerable length has to be formed in the bottom edge of the casing to permit its movement; and in order to close said slot, while still giving the lever the necessary play to do its work, so as to prevent any tampering with the inclosed mechanism through said slot, I fasten to the lever, just within the bottom edge of the casing, a door-plate or cover, S, which effectually closes the slot or opening through which the lever projects, the said door-plate swinging with the lever in its vibrating movements.

In order to permit ready access to the trip-recording wheel or drum by the proper officer—at the end of each day's work, for example, at which time the recording-slip is to be removed from the machine and examined (the slip being preserved as a permanent record, if desired) and a new one put in its place about the drum for the succeeding day's work—I form, say, the upper half of the back plate, $a'$, of the casing in the form of a door hinged to the lower half of the plate, and locked so as to close the casing against all save the proper officer of the company or the proprietor, who retains the key.

The operation of the machine, which may be used either as a portable machine suspended from the conductor's person or as a stationary machine secured in the car or vehicle, is as follows: As soon as a fare is received the conductor should actuate the machine, moving the lever E in its forward direction to cause its pawl F to actuate the trip-register, and through the lever I also concurrently move the total-register one point, and by the gearing K K' $K^2$ $K^3$ also concurrently move the screw-threaded sleeve L and the drum or wheel $L^2$, which latter by its recording-slip registers the fare simultaneously with the registry by the trip and total registers. The movement of the lever also causes its pawl F' to operate the alarm apparatus, thereby notifying those in the car that the fare has been properly registered and the conductor faithful to his trust. This operation is repeated as each fare is received until, say, fifty fares are received and recorded at the time the car reaches the end of its trip. The trip-register will then show 50 at the window $a^3$, the total-register will indicate 50 at its window $j^5$, or a similar increase over the record as it stood before the current trip, while the trip-recording wheel or drum will also have been moved the distance of fifty spaces or fifty points, which, starting at the commencement of a day's work, for example, would be the first fifty registered, to accomplish which a half-revolution of the drum has taken place. The marking-point $m$, which is placed in its screw-thread, so as to start at the commencement of the spiral line on the recording-slip, has also been moved correspondently with the movement of the trip-recording drum $L^2$, so as to follow the spiral line of the recording-slip on said drum. The covering-plate is now turned to gather or reset the trip-register to zero, the commencement of which operation advances the marking-point $m$ to mark or puncture the paper slip at the fiftieth space from the commencement, and is then retracted, whereby it will be obvious that not only is the resetting movement of the trip-register recorded, but its condition at the time of resetting indicated as well. The punctures or marks on the recording-slip will show exactly what number of fares were registered on the trip-register at each resetting operation, and consequently the number of such resetting movements. The spiral rows of spaces around the drum, of which there are ten, formed by the spiral longitudinal lines and the transverse lines of the recording-slip, will register one hundred for each row, or one hundred for each revolution of the drum, while the exact number registered short of one hundred will be shown by the numbered transverse lines. Inasmuch as there are ten rows of spaces around the drum, the recording-slip in this example has the capacity of registering concurrently with the other registers from one up to a thousand fares, which is a capacity amply sufficient for a day's work.

The advantages of a trip-recorder which shows not only the number of resetting movements given to the trip-register, but also the condition of said register at each of such resetting movements, has been fully set forth in my patent of April 20, 1880, and application of August 30, 1879, hereinbefore mentioned, and need not be recited here.

In Figs. 20, 21, 22, and 23 of the accompanying drawings I have shown another form of the trip-recording devices.

Instead of a pointed marking or puncturing arm, M, reciprocated by an eccentric, I substitute a flat bar, $M^2$, slotted at its lower end to receive a guide pin or stud, $m'$, on the rear partition-plate, $B^2$, which permits the bar to be freely moved endwise. The upper end, $m^2$, of said bar $M^2$ is wedge-shaped or inclined, as shown clearly in Fig. 23, and it works through a lateral or transverse opening in a stud-shaft or arbor, W, extending backward from the main partition-plate B. (See Figs. 20 and 23.) One end of a pitman or rod, $N^2$, is pivoted to the bar $M^2$, while its opposite end is fitted to the crank N', which is firmly connected to the rear end of the spindle $f$ of the zero-gathering or turning covering plate G in place of the eccentric N, before described. As said zero-gathering or covering plate is turned to reset the trip-register the bar $M^2$ will be reciprocated through its pitman $N^2$.

A disk or wheel, $L^2$, is rigidly connected preferably to the back of the partition-plate B, and said disk is provided on its face, fronting the back of the machine, with a spiral groove, $n'$.

Figure 21:
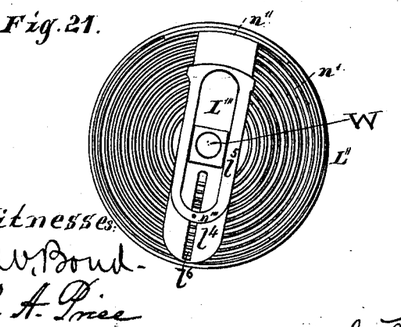
Fig. 21 is a plan view of a portion of said modified devices, showing a stationary disk or wheel having a spiral groove for moving the marking-point of the recorder.
Figure 22:
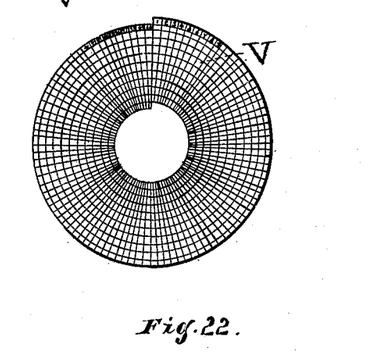
Fig. 22 is a face view of the recording slip or dial for use with said modified trip-recording devices, said dial being carried by a stationary cap-piece fitting over or in front of said spirally-grooved wheel or disk.
Figure 23:
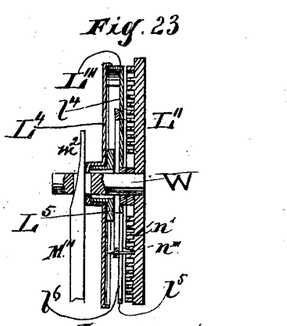
Fig. 23 is a vertical longitudinal section through a portion of said modified devices on the line 23 23 of Fig. 20.

(See Figs. 21 and 23.) A marking or puncturing point carrier, L³, made up of two sections, l⁴ l⁵, is fitted in front of the spirally-grooved face of the disk L², so as to turn around the shaft or arbor W as an axis when moved by the gearing from the first wheel J of the total or general register, whereby it will be understood said carrier is moved concurrently with said wheel J in the counting process. The section l⁵ of the carrier L³ slides upon the section l⁴ laterally relatively to the disk L². Said sliding section l⁵ carries a pin, n³, which passes through a longitudinal slot, l⁶, in the section l⁴ of the carrier. The inner end of said pin n³ enters the spiral groove n' in the disk L², while its opposite end projects above the rear face of the sliding-carrier section, and is sharp-pointed, so as to mark or puncture the paper recording-dial V, Fig. 22.

Figure 20:
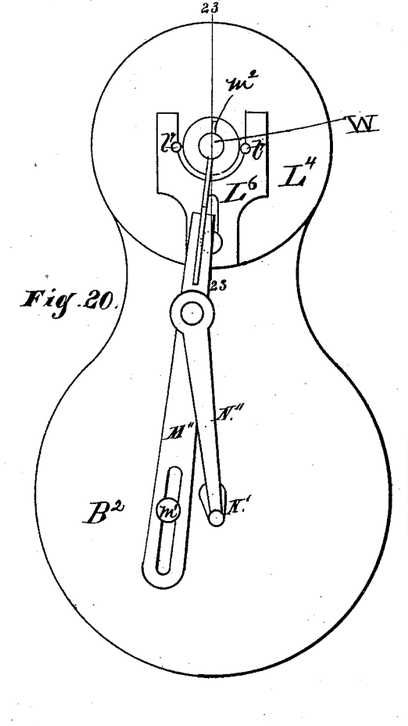
Fig. 20 is a view from the back, with the casing removed, of a modified form of trip-recording devices.

The recording-dial V to be used with this modified form of recording device is circular in shape, and is held by a stationary or non-rotating circular cap-piece, L⁴, fitted back of the marking-point carrier around the arbor or shaft W, Figs. 20 and 23. Said dial has a spiral line on its face corresponding to the spiral groove in the disk L², and this spiral line is divided by transverse or radial lines, so as to form spiral rows of spaces, which are numbered as shown in Fig. 22. The dial is fitted in the cap-piece L⁴, (with its graduations facing the marking-point of the pin n³,) and is held in place preferably by a washer or plate, L⁵, having pins l⁷, which pass through the cap-piece, and are engaged by a suitable slide or device, L⁶, on the outside of the cap-plate. (See Figs. 20 and 23.) This permits ready removal of the dial and the substitution of a new one.

The arbor or stud-shaft W, around which the marking-point carrier L² turns when driven by gearing from the total-register, projects beyond the removable cap-piece L⁴, and has a lateral or transverse opening through it to receive the wedge end m' of the bar M², as before mentioned. As the carrier L³ is rotated step by step concurrently with the trip and total registers the marking-point, by reason of the working of the pin n³ in the spiral groove of the stationary disk L², will be caused to follow the spiral of the paper dial, but just out of contact preferably with said dial. When the trip-register is being reset the bar M² is reciprocated, as before stated, which will cause its wedge or inclined end to force the cap-piece and paper dial against the marking or puncturing-point, and said dial will thus be marked or indented, to show not only the number of trips made, but also the number of fares registered on each trip. At the close of a day's work, for example, the dial is removed, a new dial is inserted in the cap-piece, and the marking-point is sprung up and slid out to the beginning of the groove, so as to traverse the fresh dial on the succeeding day.

I claim as my invention—

1. The combination, substantially as hereinbefore set forth, of the trip-register disks, the bell hammer lever, the actuating-lever of the machine, the pawl carried by said actuating-lever to actuate said disks, the pawl carried by said actuating-lever to rock the bell-hammer against the impelling force of a spring, the ratchet-teeth upon said bell-hammer lever, the detent-pawl engaging said teeth to prevent the recoil of the bell-hammer lever to strike the bell until said pawl is disengaged, a lug or shoulder on said actuating-lever to disengage said detent pawl when a movement of the actuating-lever has taken place sufficient to actuate the register-disks, and a stop against which the pawl which rocks the bell-hammer lever is carried to disengage it to permit the alarm to be sounded.

2. The combination, substantially as hereinbefore set forth, of a register-wheel, an alarm device, and an actuator carrying double-armed actuating-pawls to operate said wheel and device, said pawls being so connected that the alarm-actuating pawl cannot engage the alarm device to operate it without the engagement of the register-actuating pawl to move the register.

3. The combination, substantially as hereinbefore set forth, of the bell-hammer lever, the ratchet-teeth of said lever, the detent-pawl engaging said teeth to prevent the recoil of said lever, the actuating lever having an actuating pawl engaging said bell-hammer lever to rock it against the force of an impelling-spring, and also having a lug to disengage said detent-pawl and a stop to disengage said actuating-pawl from said hammer-lever to permit it to strike the bell.

4. The combination, substantially as hereinbefore set forth, of the trip-disks, the setting-projections of said disks, the turning covering-plate to act upon said projections having gear-teeth in its edge, and a pinion-wheel actuated from the exterior of the casing and capable of rotation in one direction only to rotate said covering-plate to bring the trip-disks to zero.

5. The combination, substantially as hereinbefore set forth, of the turning covering-plate, the rocking catch, which normally lies in the path of said plate to prevent its forward movement beyond the point to bring the trip-disks to zero, the spring acting upon said catch to maintain it in said normal position, and the slide operated from the outside of the casing to control said catch.

6. The combination, substantially as hereinbefore set forth, of the total-register, the trip-register, the actuating handle or lever to actuate said registers simultaneously, or nearly so, for consecutive counting, the rotating trip-recording wheel or device, and the gear-connection by which said device is driven concurrently with the total and trip registers.

7. The combination, substantially as hereinbefore set forth, of the total-register, the trip-register, the actuating handle or lever to actuate said registers simultaneously, or nearly so, for consecutive counting, the rotating trip-recording wheel, the gear-connection by which said wheel is driven to move concurrently with the trip and general registers, the recording slip or dial, the reciprocating marking device to mark or puncture said slip or dial, and mechanism to simultaneously reset the trip-register and operate said marking device.

8. The combination, substantially as hereinbefore set forth, of the trip-recording wheel, the recording-slip having spiral lines thereon carried by said wheel, the reciprocating marking-arm, mechanism to positively reciprocate said marking-arm to cause it to mark or puncture the recording-slip, a turning screw-sleeve to compel the point of the marking-arm to follow the spiral of the recording-slip, gearing to rotate said recording-wheel and said screw-sleeve concurrently, and ratchet-and-pawl connections between said gearing and said wheel and sleeve.

9. The combination, substantially as hereinbefore set forth, of the trip-recording wheel or drum, the sleeve carrying said wheel or drum, the stud-axle around which said sleeve turns, the ratchet-wheel firmly connected with said sleeve, and the driven gear-wheel, also turning about said stud-axle and having a pawl to engage said ratchet-wheel to turn it.

10. The combination, substantially as hereinbefore set forth, of the trip-register, the trip-recording wheel registering concurrently with said register, the reciprocating marker moving back and forth in a right line to puncture or mark a recording-slip carried by said recording-wheel, the guides of said marker, and the eccentric, or its equivalent, to reciprocate said marker during the resetting movement of the trip-register.

NEWMAN A. RANSOM.

Witnesses:
O. W. BOND,
B. A. PRICE.